United States Patent
Schehr

(10) Patent No.: US 7,560,663 B2
(45) Date of Patent: Jul. 14, 2009

(54) ELECTRIC HEATING MODULE FOR HEATING AIR FLOW, IN PARTICULAR IN AUTOMOBILES

(75) Inventor: Ingo Schehr, Jockgrim (DE)

(73) Assignee: MicroHellix GmbH, Berg (DE)

( * ) Notice: Subject to any disclaimer, the term of this patent is extended or adjusted under 35 U.S.C. 154(b) by 231 days.

(21) Appl. No.: 11/462,136

(22) Filed: Aug. 3, 2006

(65) Prior Publication Data

US 2007/0045262 A1 Mar. 1, 2007

(30) Foreign Application Priority Data

Aug. 6, 2005 (DE) ............... 20 2005 012 394 U

(51) Int. Cl.
- H05B 3/24 (2006.01)
- H05B 3/10 (2006.01)
- B60H 1/22 (2006.01)
- F24H 3/06 (2006.01)
- F24H 3/10 (2006.01)

(52) U.S. Cl. ............... 219/202; 219/504; 219/530; 392/361

(58) Field of Classification Search ............ None
See application file for complete search history.

(56) References Cited

U.S. PATENT DOCUMENTS

| | | | | |
|---|---|---|---|---|
| 1,879,889 A * | 9/1932 | Ballentine | ............ | 219/540 |
| 1,928,270 A * | 9/1933 | Shirley | ............ | 392/365 |
| 2,286,853 A * | 6/1942 | Holthouse | ............ | 237/2 A |
| 2,429,733 A * | 10/1947 | Trent | ............ | 392/366 |
| 3,217,793 A * | 11/1965 | Coe | ............ | 165/80.3 |
| 3,449,552 A * | 6/1969 | Graves | ............ | 219/530 |
| 3,479,489 A * | 11/1969 | Renzi | ............ | 219/540 |
| 3,995,143 A * | 11/1976 | Hervert | ............ | 392/360 |
| 4,117,308 A * | 9/1978 | Boggs et al. | ............ | 392/360 |
| 4,250,630 A * | 2/1981 | Moses | ............ | 392/383 |
| 4,794,227 A * | 12/1988 | Antoniazzi et al. | ............ | 219/532 |
| 4,855,570 A * | 8/1989 | Wang | ............ | 219/532 |
| 4,876,436 A * | 10/1989 | Ide et al. | ............ | 392/360 |
| 5,168,811 A * | 12/1992 | Cox et al. | ............ | 101/424.1 |
| 5,243,683 A * | 9/1993 | Yang | ............ | 392/379 |
| 5,326,418 A | 7/1994 | Yeh | | |
| 5,668,920 A * | 9/1997 | Pelonis | ............ | 392/361 |
| 6,737,615 B2 * | 5/2004 | Lange et al. | ............ | 219/536 |
| 2003/0095795 A1 * | 5/2003 | Birdsell et al. | ............ | 392/365 |

FOREIGN PATENT DOCUMENTS

| | | |
|---|---|---|
| DE | 452036 | 11/1927 |
| DE | 909848 | 4/1954 |
| DE | 3234007 | 3/1984 |
| DE | 8016915 | 11/1984 |

(Continued)

Primary Examiner—Joseph M Pelham
(74) Attorney, Agent, or Firm—Volpe and Koenig, P.C.

(57) ABSTRACT

An electric heating module for heating air flow, in particular in vehicles, is provided by the invention having at least one PTC heating element 10 and at least one adjacent heat dissipating area 13, through which air can flow, with heat conducting ribs being in an effective contact to the PTC heating element 10 as well as the PTC heating element 10 and the heat conducting ribs 13, combined by a frame 1 to form a module. The invention is characterized in that the heat dissipating area is embodied circular, in particular round.

23 Claims, 10 Drawing Sheets

FOREIGN PATENT DOCUMENTS

| | | |
|---|---|---|
| DE | 3821435 | 12/1989 |
| DE | 4223595 | 9/1993 |
| DE | 10118599 | 11/2002 |
| DE | 10317286 | 10/2004 |
| EP | 0350528 | 1/1990 |
| EP | 1157667 | 11/2001 |
| EP | 1432287 | 6/2004 |
| EP | 1479918 | 11/2004 |
| FR | 2293846 | 12/1974 |
| FR | 2580451 | 10/1986 |

\* cited by examiner

ELECTRIC HEATING MODULE FOR HEATING AIR FLOW, IN PARTICULAR IN AUTOMOBILES

BACKGROUND

The invention relates to an electric heating module for heating an air flow. This heating module is particularly provided for heating air flow in vehicles, such as motor vehicles or air planes. It essentially comprises at least one PTC—heating element and at least one heat dissipating area with heat conduction ribs, adjacent thereto and allowing air to flow through it, said ribs being effectively connected to the PTC heating element. The PTC heating element is combined with the heat conducting ribs using a frame to form a module.

PTC elements are semi-conductor resistors made from ceramics, with their active resistance depending on the temperature. The resistor—temperature characteristic does not progress linearly: the resistance of a PTC heating element first reduces only slightly with the temperature of the component rising, in order to subsequently rise rapidly at a characteristic temperature (reference temperature). This overall positive progression of the resistance—temperature characteristic (PTC=positive temperature coefficient) leads to the PTC heating element having self-controlling features. When the temperature of the component is considerably lower than the reference temperature the PTC heating element has a lower resistance so that correspondingly high current can be conducted. When a good heat dissipation from the surface of the PTC heating element is ensured, appropriately high electric power is drawn and dissipated in the form of heat. However, when the temperature of the PTC heating element exceeds the reference temperature, the PTC resistance increases rapidly so that the electric power draw is limited to a very low value. The temperature of the component then approaches an upper limit, which depends on the heat absorption of the environment of the PTC heating element. Under normal conditions, the temperature of the component of the PTC heating element can therefore not exceed beyond a characteristic maximum temperature, even when the intended heat dissipation is entirely interrupted in the case of a malfunction. This and the self-controlling features of a PTC heating element, based on which the drawn electric power is precisely equivalent to the dissipated thermal power, predestines the PTC heating element for use in heating and/or air conditioning systems of vehicles or other applications of heated air flow in vehicles. For reasons of safety, in this application field no flammable temperature may develop in the heating element, even in the case of a malfunction, although high heating output is required in normal operation.

For heating the interior compartment of vehicles it has been known to use electric heating modules having a frame, which forms a module by combining a multitude of PTC heating elements and heat dissipation areas with heat-conducting ribs adjacent thereto, allowing air to flow through. An example for such a known electric heating module is found in EP 0 350 528 A1.

In EP 1 479 918 A1 a complete ventilation module, comprising a radial fan integrated in a housing and a heating module of the type mentioned at the outset is disclosed, which is to serve as a heater for a seat in a ventilated vehicle seat. Due to the fact that a vehicle seat, for safety reasons, even in the event the ventilator malfunctions, may not exceed a maximum temperature at its surface which is tolerated by human beings, heating modules with PTC heating elements are excellently suitable, in particular because, while providing equivalent safety, they can dissipate a considerably higher heating output than conventional mats, used as heaters for seats, having electric resistance wires, with their power draw having to be very limited for safety reasons.

The previously known electric heating modules of the type mentioned at the outset generally comprise several layers of planar, side-by-side arranged PTC heating elements with their narrow sides in line with the air flow, which at their flat surfaces and their bottom sides each electrically contacting metal sheets. The adjacent heat dissipating areas are provided with meandering metal ribs, which also are positioned with their narrow sides in the air flow and at their wide side thermally contacting metal sheets of the PTC heating elements in regular intervals for heat dissipation. In order to achieve good heat transfer from the PTC heating elements to the heat conducting ribs heat conducting glue or other connection techniques can be used; however, it has been proven the most efficient solution to place the PTC heating elements and the heat conducting ribs into a frame combining them to a module and to provide inside said frame at least one spring element, which presses the alternating arranged heat dissipating areas with the heat conducting ribs against the bars with the PTC heating elements.

However, this requires a rectangular shape of the electric heating module with a cellular structure of the components, which is aerodynamically not optimal for heating air flow, in particular when the space for the respective air-flow guiding channels is very limited, like in a motor vehicle. Thus it is logical for the ventilation module for vehicle seats according to EP 1 479 918 A1 to use a radial fan. However, radial fans are known to be less suitable for this purpose because they create a high pressure with correspondingly high flow speeds.

Furthermore, the production of the known electric heating modules is hardly possible in an automated fashion due to their multi-layered, spring-loaded design within a frame. Rather, a large amount of manual labor is necessary.

SUMMARY

Starting from this prior art, the object of the present invention is to provide an electric heating module of the type mentioned at the outset, which is improved with respect to its efficient use even in limited spatial conditions, such as in motor vehicles, as well as regarding the possibility for an automated production.

This object is attained in an electric heating module having the features of the invention.

According to the present invention, an electric heating module of the type mentioned at the outset is modified such that the heat dissipating area is embodied in a circular manner. Of course, here a circular shape is particularly preferred; however the invention is not limited thereto. Rather a flattened, elliptical, or arena-shaped circular form as well as a shape with n-number of corners is also included in the scope of the invention. Such a circular arrangement of the heat dissipating area with its heat conducting ribs, which are preferably arranged extending essentially radially, allows the electric heating module according to the invention in its existing shape to be inserted into an aerodynamically cylindrical air flow channel or an appropriate pipe with a very even flow of the heat dissipation area being ensured without the formation of hot pockets, such as for example in the corners of conventional, rectangular, cellularly arranged heating modules. Primarily, a heating module according to the invention, i.e. having a circular shaped heat dissipation area, is suitable for an efficient combination with an axial or diagonal fan, though; said fan can then very easily be placed in front or behind the heating module according to the invention in order to form a heating ventilator safe from overheating.

In a radially extending arrangement of the heat conducting ribs the great advantage develops in reference to prior art that the air flow does not only flow through the ribs in the axial direction but that the air flow, in particular with an appropriate design of the flow channel, is additionally provided with a radial speed component along the ribs so that they are not flown through one-dimensionally but two-dimensionally. This increases the efficiency of the heat dissipation into the air flow.

In a preferred manner, the flat PTC heating elements, their large sides each forming an upper and a lower contact surface, are essentially arranged perpendicular to the air flow, i.e. such that the contacting surfaces are essentially positioned in the radial planes. However, the heat conduction ribs must certainly extend with their large sides parallel to the air flow so that they can easily be flown through. The heat conducting ribs then meet the contacting surfaces of the PTC heating elements essentially perpendicular, or if necessary indirectly the electric power conducting contact elements, which are supported on the contact surfaces of the PTC heating elements. This provides the advantage that the heat conducting ribs much better resist the pressure against the PTC heating elements and/or the contact elements because in the direction of the narrow sides it has the highest stability. An automatic and/or fully automated production of the electric heating module according to the invention is much easier therefore. Simultaneously, the unconventional arrangement of the PTC heating element does not interfere because the heat dissipation element according to the invention is embodied circular. The PTC heating elements can therefore be arranged in the center of the ring, in which the motor of an axial fan is located as well or alternatively or additionally a multitude of PTC heating elements can be arranged ring-shaped at the outside around the heat dissipation area, preferably outside the air flow channel. This way the unconventional arrangement of the PTC heating element does not reduce the surface area of the air flow to be heated.

When the frame can additionally be separated in a parting plane extending essentially radially, said line in the frame is assembled in one direction during automated production parallel to the air flow and not, as in prior art, perpendicular thereto. Therefore, the circular ribs and the PTC heating elements can be inserted into one half of the frame and the frame can then be closed by placing the other half onto it without impinging the heat dissipating area with potentially excessively high forces. Only that portion of the heat conducting ribs forming the heat transfer areas and directly or indirectly placed on the PTC heating elements are preferably compressed axially with a spring element. However, due to the fact that the ribs, as mentioned, have a much higher stability in the axial direction than in the radial direction not only the pressure can be increased for a better heat transfer but in particular a fully automated production of the heating module according to the invention is then possible.

At the parting plane of the frame preferably a spring element is inserted in the frame for an axial pressure of the heat conducting ribs towards the PTC heating element and/or the contact elements placed thereupon. This spring element can be made from a soft-elastic material, in particular an elastomer, and in the production technologically most simple case comprises a conventional O-ring, if necessary provided with circularly distributed recesses for reducing pressure. Such a spring element made from soft-elastic material is not only advantageous for its very cost-effective production; additionally it is also heat insulating so that at this location no heat loss occurs and the thermal energy dissipating from the PTC heating element is efficiently transferred to the air flow.

Alternatively to the above-described spring element, separately inserted into the frame and made from a soft-elastic material, the frame itself can at least partially be made from a soft-elastic material and have at the parting plane an essentially circular spring section for an axial pressure of the heat conducting ribs towards the PTC heating elements and/or the contact elements, for example in the form of a lip pulled inward. This further facilitates the production technology of the heating module according to the invention.

The heat conducting ribs are preferably formed from U-profiles with their U-backs forming the heat dissipation areas, which are supported on the upper and/or the lower contact surfaces of the PTC heating elements and/or indirectly on their contact elements, and ensure the heat transfer from the PTC heating elements to the ribs. The U-legs of the heat conducting ribs can here be provided with surface structures, in particular bead-like structures for guidance and, in particular, also for eddying the air flow. The creation of eddies in the air flow at such surface structures improves the convective heat transfer in the air flow and thus the heat dissipation from the ribs into the air flow is significant.

Alternatively to the formation of the heat conducting ribs as U-profiles they can also be formed from sheet metal bent in a meandering form with the bends towards the center of the heat dissipation area each being provided with a smaller bending radius for producing the circular shape. Preferably the bends pointing towards the center of the heat dissipation area are each compressed to a fold. The welding of the U-profiles to one another for forming the ring of ribs thus is omitted, which results in a facilitation of the production.

When the heat conducting ribs are produced from a meandering, bent metal sheet, several assembled parts can form the ring of ribs, or a single bent metal sheet forms the ring of ribs. For better heat transfer to the PTC heating elements, here again a circular heat transfer section can be provided, which is preferably put as a heat conduction—circular metal sheet onto the heat conducting ribs. This heat transferring—circular metal sheet may also comprise several sections and is not necessarily formed in one piece; if necessary, it can also be omitted in its entirety so that the meandering bent ribs are simply supported with their narrow side on the contact rings of the PTC heating elements.

As mentioned above, the circular embodiment of the heat dissipation area according to the invention offers the extremely advantageous chance to combine an axial or diagonal fan with an electric heating module to form a heating ventilator. Here, it is advantageous when a ventilator housing is mounted at the frame of the electric heating module, preferably being formed thereat. The latter is particularly advantageous when the heating ventilator formed thereby, which can be integrated for example in vehicle seats, is to be assembled automatically.

The combination of a fan with the heating module according to the invention can be made such that the heat dissipation area of the heating module, though which air can flow, is arranged upstream from the fan in its laminar input area. However, an arrangement is preferred, in which the heat dissipation area of the heating module, through which air can flow, is arranged downstream from the fan in its output area, because here the air flow forms an eddy and the transfer of heat from the heat conducting ribs in the air flow occurs more efficiently in an eddy. Additionally, at the input of an eddy in radially arranged ribs, the ribs are flown over two-dimensionally by the air, as mentioned above.

The frame and ventilator housing mounted thereto or formed thereat in an integrated manner can advantageously form a common, essentially cylindrical air flow channel, with the frame optionally being provided with flow guiding bars extending into the air flow channel. Such an embodiment of an integrated heating ventilator is particularly advantageous in the flow guidance with simultaneously ensuring a very homogenous heat transfer from the PTC heating elements to the air flow. The use of PTC heating elements is therefore particularly efficient in this preferred further embodiment of the invention. Simultaneously, the entire heating ventilator is very small and flat so that particularly the use in ventilated vehicle seats is possible without any problems. Based on the relatively low flow speeds of air out of such heating ventilators according to the invention the use in motor vehicles is not only possible but particularly advantageous.

Concentrically arranged guidance rings can be arranged in the air flow at the above-mentioned bars to guide the air flow. Depending on the application, it can be advantageous for these guidance rings to be arranged in a tilted fashion in reference to the axial plane, in particular in a concentric, conical form so that the air flow at the guidance rings is radially deflected outwardly during the outward flow and/or is deflected in the axial direction when the guidance rings are arranged in the input flow of the heating ventilator. In addition to the effect of the air flow guidance, which profits from the respective air flow deflection depending on the application, a concentric conical embodiment of the guidance rings can reduce the danger of foreign objects entering the air flow channel.

When the frame and the ventilator housing form a common air flow channel, several PTC heating elements can be arranged circularly around the air flow channel, thus outside of its cross-sectional area. This does not result in any shading by the PTC heating elements so that the air flow is not affected. Alternatively or additionally, in the center of the essentially cylindrical air flow channel another or a single PTC heating element or several such elements can be arranged. This too results in hardly any shading effect for the air flow, because the fan positioned in front or behind it is centrally positioned anyways and usually also provided with a centrally arranged motor.

For the purpose of an automated production of the electrical heating module according to the invention having an integrated fan, below and above the PTC heating elements preferably one circular metal sheet is arranged for an electric contact thereto, with the heat dissipating sections of the heat conducting ribs being supported on one of the circular metal sheets and the spring element made from soft-elastic material and/or the circular spring section of the frame on the other one of the two circular metal sheets. The circular metal sheet can here be provided with contacting protrusions, which are guided outward through openings in the frame. Furthermore, the ribs can be pre-manufactured as a connected ring of ribs so that ultimately the assembly of the heating ventilator according to the invention can be carried out in a fully automated manner.

BRIEF DESCRIPTION OF THE DRAWINGS

In the following, exemplary embodiments for a heating module according to the invention are described and explained in greater detail using the attached drawings. Shown are.

DETAILED DESCRIPTION OF THE PREFERRED EMBODIMENTS

Figure 1:
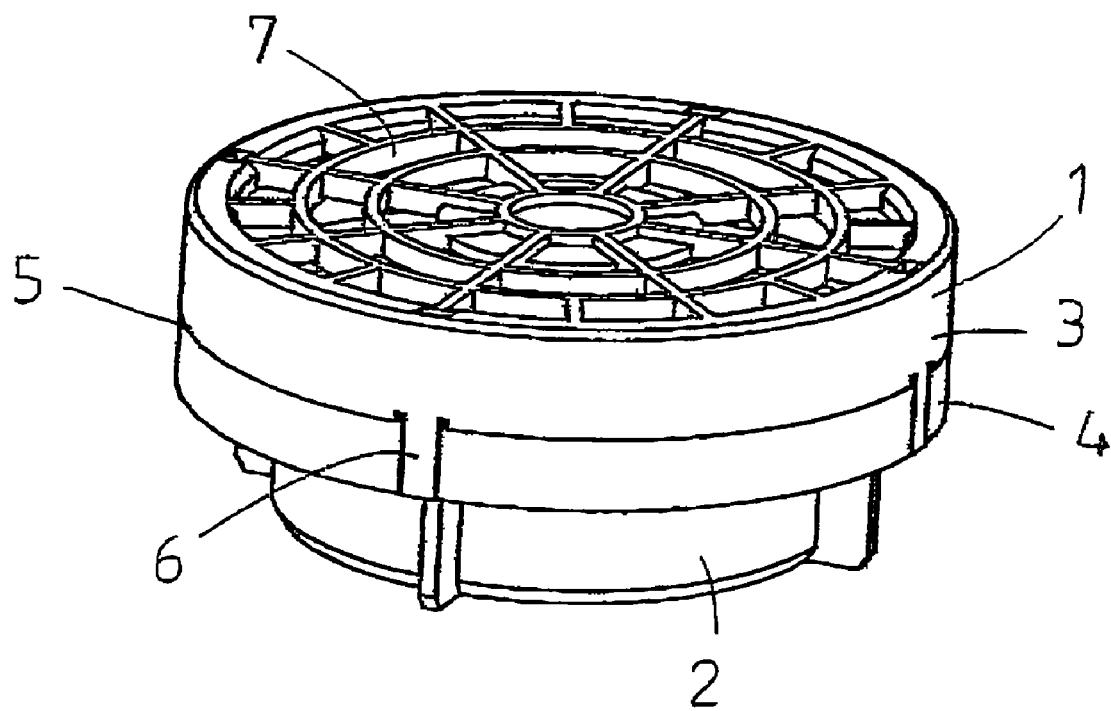
FIG. 1 a perspective view of a first exemplary embodiment of a heating module with a fan according to the invention.
Figure 3:
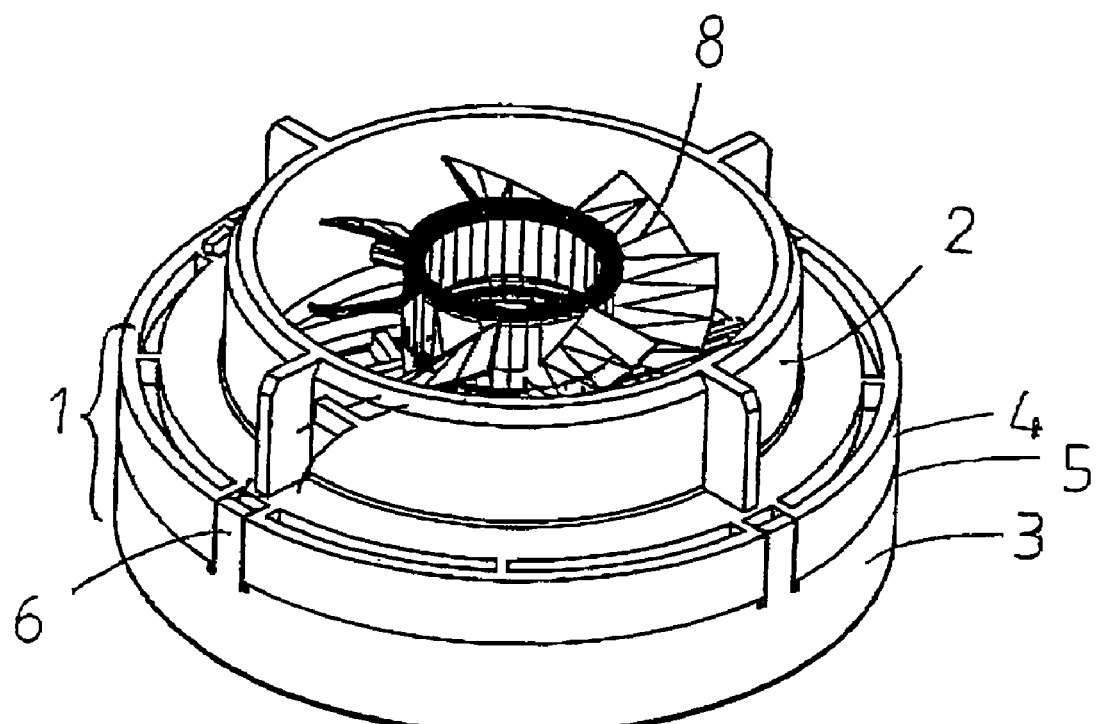
FIG. 3 the exemplary embodiment of FIG. 1 in a perspective view from below.
Figure 2:
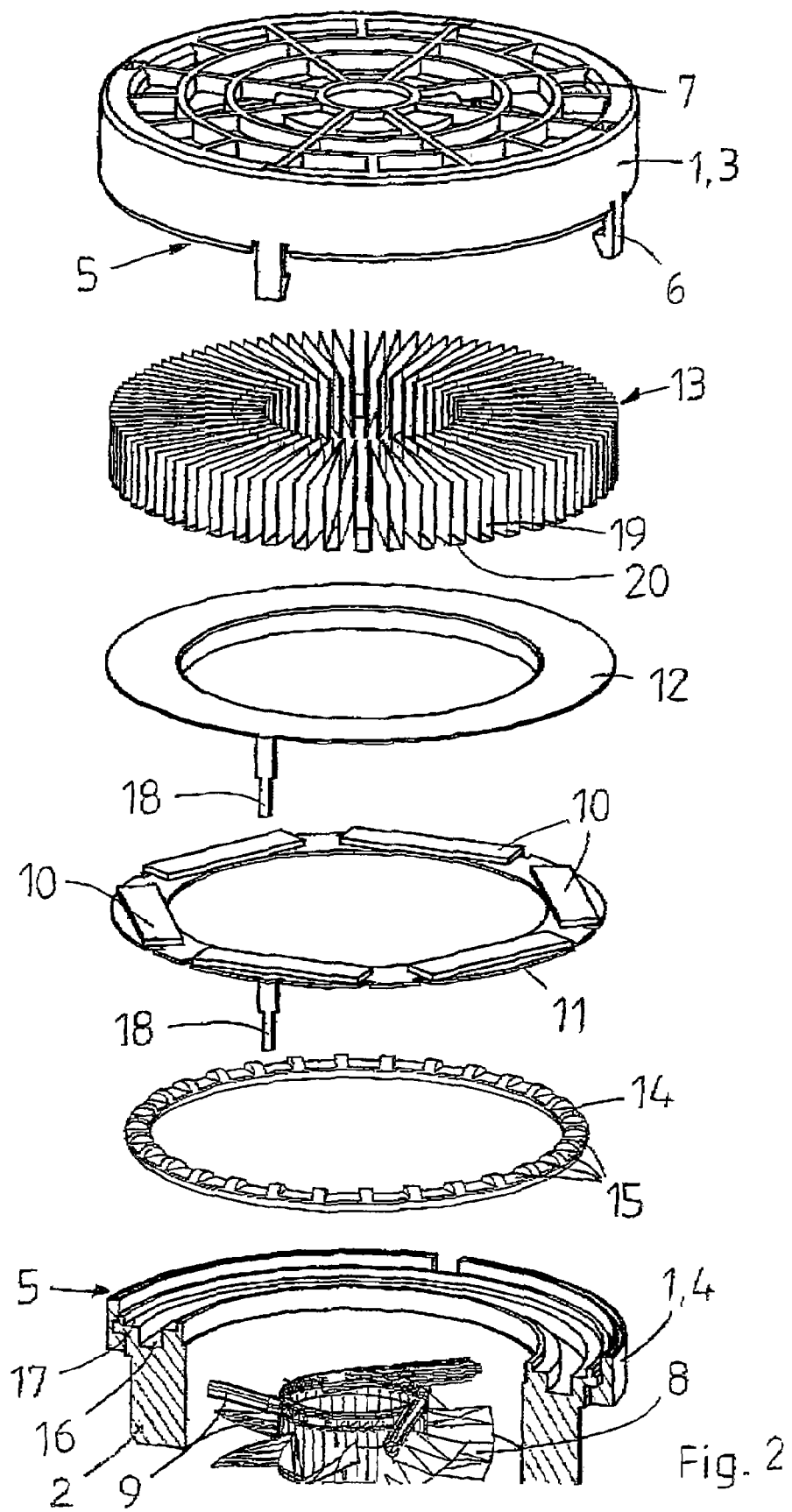
FIG. 2 the exemplary embodiment of FIG. 1 in an exploded view.

FIGS. 1 through 3 show a first exemplary embodiment of an electric heating module according to the invention, which is combined with a fan to form a heating ventilator. A frame 1 is connected in one piece to a ventilator housing 2, both of which are having an essentially cylindrical shape and form in their interior an aerodynamic, cylindrical channel for the air flow to be heated. The frame 1 comprises two parts and has an upper part 3 and a lower part 4, which are supported on one another in a radial parting plane 5 and are held together by hooked snaps 6. In the outflow area of the device shown, the frame 1 is provided with bars 7 which extend into the airflow and guide it. The ventilator housing 2 includes a diagonal fan 8, which is mounted to the ventilator housing 2 via fasteners 9. The diagonal fan 8 is a conventional fan with a centrally arranged electric motor (not shown here). In FIG. 2, the ventilator housing 2 is partially sectioned in order to open the view to the fan 8.

Downstream from the diagonal fan 8, in the parting plane but outside the cylindrical flow channel, six PTC heating elements 10 are arranged, adhered to a lower circular metal sheet 11, around said channel. Above it, an upper circular metal sheet 12 made from aluminum is put onto the PTC heating elements 10 in order to contact them both electrically as well as thermally. The upper circular metal sheet 12 transfers the heat dissipating from the PTC heating elements 10 to the ring of ribs 13, which forms a circularly embodied heat dissipation area according to the invention, by its individual ribs radially extending into the cylindrical air flow channel in the direction of the center.

The construction unit comprising a lower circular metal sheet 11, PTC heating elements 10, upper circular metal sheets 12, and a ring of ribs 13 is held between the upper part 3 and the lower part 4 of the frame 1. For this purpose, a receiver 17 is provided in the bottom part 4 of the frame 1. High pressure is necessary for an efficient heat transfer from the broad sides of the PTC heating elements 10 via the upper circular metal sheet 12 to the ring of ribs 13. This pressure is ensured by a soft-elastic spring element 14, which can be made by cutting recesses 15 into a conventional O-ring seal. This creates, in cooperation with the hooked snaps 6, a pressure between the ring of ribs 13 and the upper circular metal sheet 12 as well as between the upper circular metal sheet 12 and the PTC heating elements 10.

As clearly discernible in FIG. 2, the pressure acts, in contrast to prior art, in the axial direction onto the ribs of the heat dissipation area, i.e. parallel to the air flow. Due to the fact that here the narrow sides of the ribs are acted upon with pressure they can compensate higher tolerances to pressure, based on their higher stability in this direction, so that an automated assembly of the heating ventilator shown is possible without any problems. One possibility for an automated production is also facilitated in that the spring element 14 is provided with a seal 16 at the bottom part 4 of the frame 1 and that the two circular metal sheets 12, 13 each carry a contact protrusion 18, which extends out of the frame 1, when it is assembled, and can be used for an electric contacting of the PTC heating element 10.

The use of a diagonal fan 8 and the arrangement of the ring of ribs 13, i.e. the heat dissipation area, through which air can flow, downstream from the diagonal fan 8, as well as an appropriate design of the upper part 3 of the frame 1 lead to the ring of ribs 13 being passed through by the air flow not only in the axial direction but also from the inside towards the outside in a diagonal component. The radial arrangement of individual ribs comprising U-profiles 19 of the ring of ribs 13 supports this air flow. However, the ribs do not comprise continuing U-profiles 19; the U-backs are rather provided at the side positioned radially outward only and there they form heat dissipating areas 20, by which the ring of ribs 13 are supported on the upper circular metal sheet 12 and is pressed onto the circular metal sheet 12 via the spring element 14.

The exemplary embodiment shown in FIGS. 1 through 3 represents a particularly compact yet still efficient heating ventilator, which is self-controlling via its PTC heating element 10, allowing an efficient heating, for example of ventilated vehicle seats, in a safe and very rapidly reacting manner. By switching off the PTC heating elements the heating ventilator can optionally serve as a fan for cooling. The arrangement shown having a circular heat dissipation area and a diagonal fan arranged in front thereof, which of course can also be embodied as an axial fan, simultaneously ensures that high air flow can be guided through it with a low power draw of the fan 8 having an advantageously low speed of output flow.

Using FIG. 2, it should be added that the ventilator housing 2 can also be mounted to the frame in a dismountable manner. It is also possible that at least the frame 1 comprises a soft-elastic material, for example hard rubber, so that in an appropriate embodiment of the receiver 17 or an inwardly directed housing lip of the frame 1, the separate spring element 14 can be omitted because the spring force is created by the frame 1 and/or by an appropriate lip.

Figure 4:
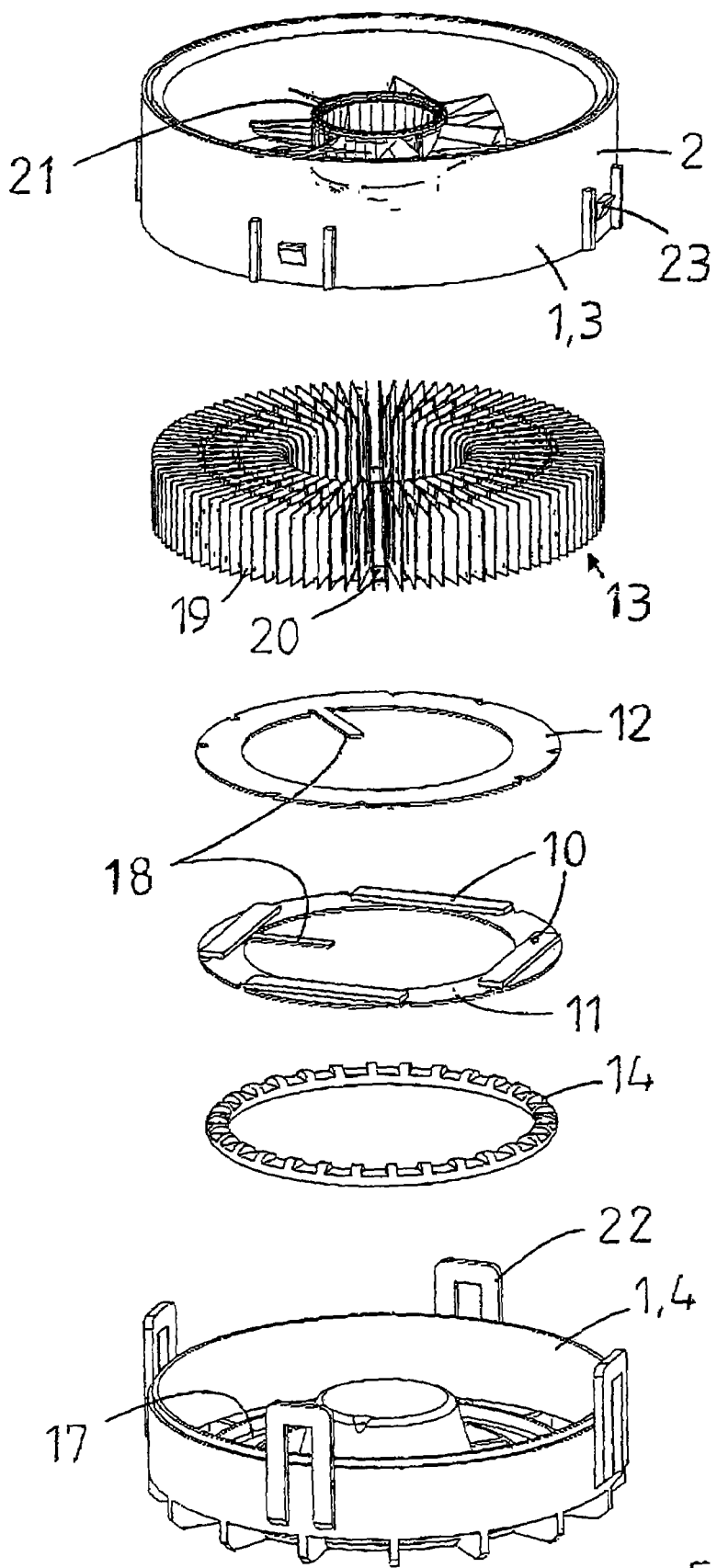
FIG. 4 an exploded view of a second embodiment of a heating module with a fan according to the invention.

Of course, it is also possible to arrange the heat dissipation area and thus the ring of ribs 13 downstream from the fan, i.e. its laminar inflow zone. An appropriate design is shown in FIG. 4 in an exploded view as a second exemplary embodiment. The housing 1 used here, also comprises an upper part 3 and a lower part 4, with the upper part 3 simultaneously serving as a ventilator housing 2 for an axial fan 21. The lower part 4 of the frame 1 is here mounted to the upper part 3 via bar snaps 22 and corresponding snapping protrusions 23.

The second exemplary embodiment of a heating ventilator shown in FIG. 4 shows another modification in addition to a "reverse" arrangement of the heat dissipating area of the heating module and the fan: The circular component comprising four PTC heating elements 10, the lower circular metal sheet 11 supporting it, the upper circular metal sheet 12, and the soft-elastic as well as thermally and electrically insulating spring element 14 are here not arranged outside the approximately cylindrical flow through area but such that the heat dissipation sections 20 of the ribs of the ring of ribs 13 are located in the radial direction approximately in the center of the circular flow through area. For this purpose, the receiver 17 in the lower part 4 of the frame 1 is arranged approximately in the center of the inflow area of the axial fan 21. The advantage of this arrangement of the heater element—component includes that the heat dissipating from the PTC heating element 10 can very rapidly and evenly be distributed over the entire rib surface of the ring of ribs 13. Further, the air flow also directly flows around the circular component with the PTC heating elements 10 so that additional heat dissipation occurs into the air flow. This is very advantageous, based on the resistance—temperature characteristic of a PTC heating element, and leads to higher effectiveness of the heating module.

The lower circular metal sheet 11 and the upper circular metal sheet 12 are each provided with a contact protrusion 18, which points to the center of a cylindrical air flow channel in order to be contacted together with the motor of the fan (not shown).

In a similar manner, other modifications of the exemplary embodiments shown are possible. For example, the central area of the cylindrical flow channel already in the shadow of the fan motor, can be used for arranging a round or several star-shaped or otherwise arranged PTC—heating elements. This can also be combined in addition to an exterior PTC heating element ring in a manner shown in FIGS. 1 through 3. It is also possible, both upstream as well as downstream from a fan to arrange an electric heating module according to the present invention or inversely upstream or downstream of a ring of ribs to insert one fan each. Of course, an electric heating module according to the invention can also be combined with a radial fan.

FIGS. 5 through 10 finally show different exemplary embodiments of ring of ribs 13, which are different both in their production technique as well as in their respective radial position of the heat dissipation area 20.

Figure 5A:
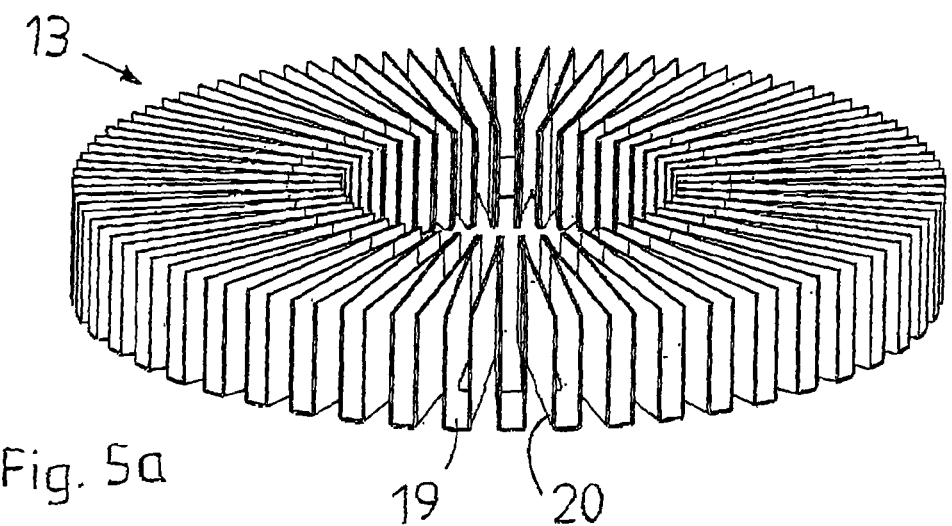
FIGS. 5a, 5b a perspective and a top view of a ring of ribs in a first embodiment.
Figure 5B:
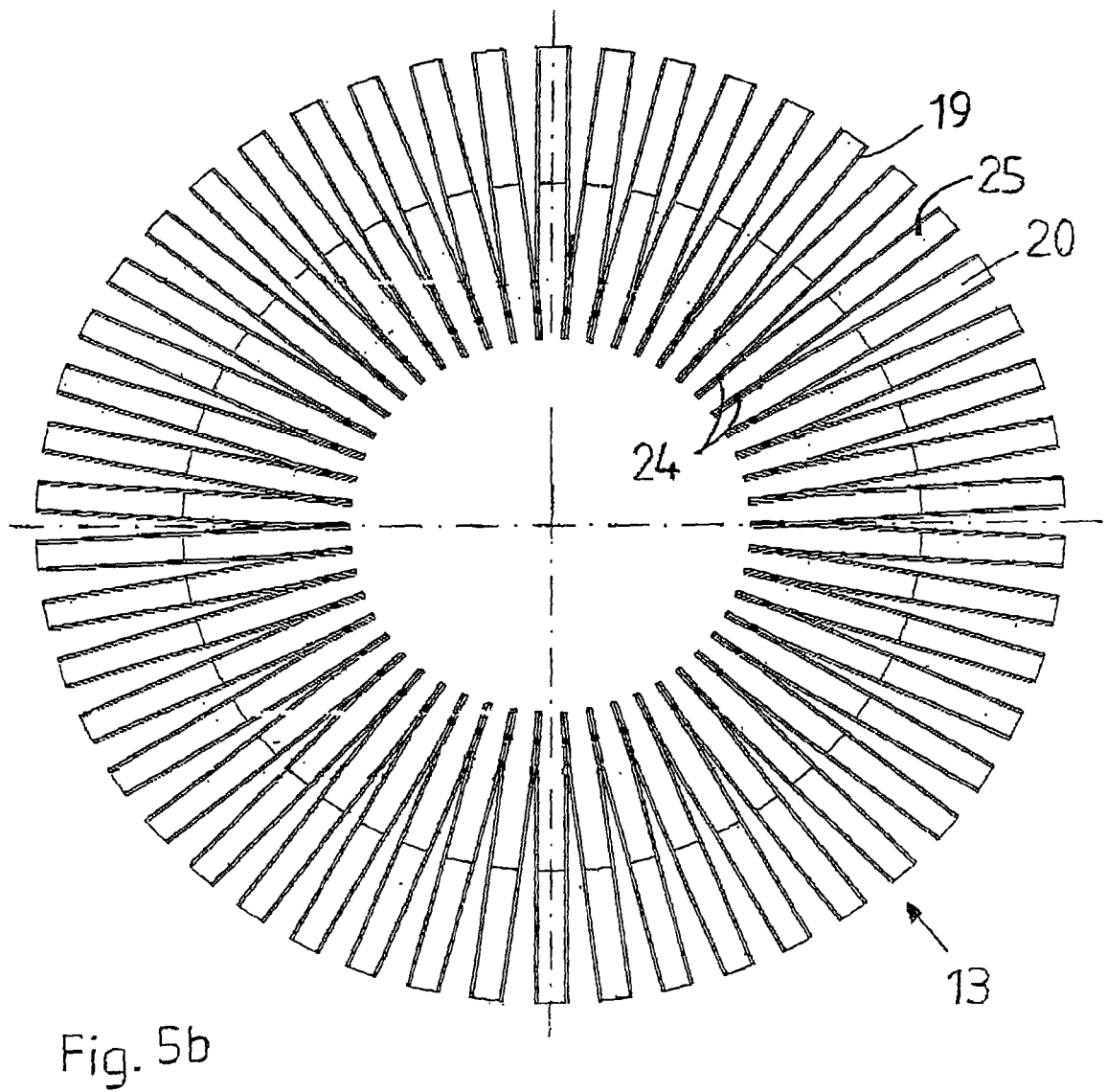

In FIGS. 5a and 5b, a ring of ribs 13 is shown combined from individual U-profiles 19 essentially extending radially. For this purpose, the U-profiles 19 radially positioned inside are connected with via laser welding spots 24 both mechanically as well as thermally. The U-backs 25 of the U-profiles 19 extend only over a section positioned radially on the outside and form the heat dissipation area 20 for thermally contacting the PTC heating elements 10 and/or the lower or the upper circular metal sheet 11, 12, depending on the embodiment.

Figure 6A:
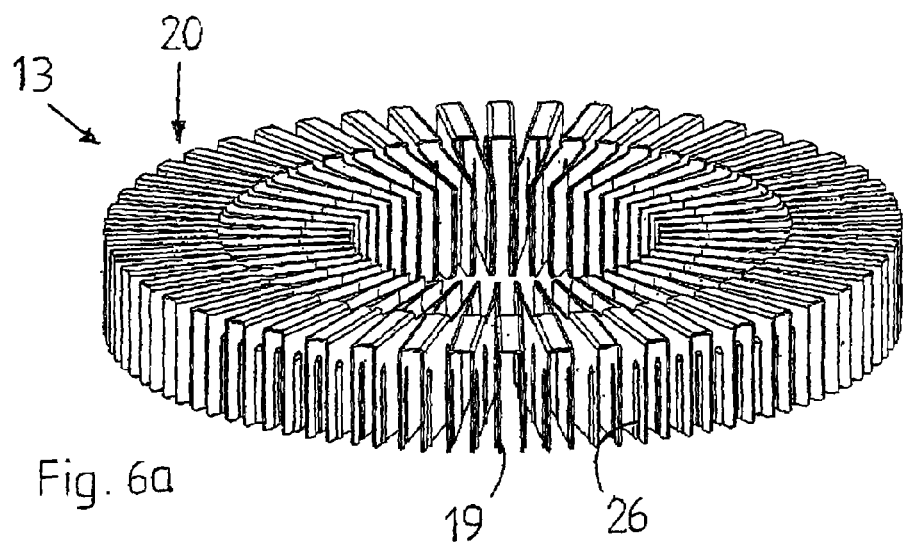
FIGS. 6a, 6b a perspective and a top view of a ring of ribs in a second embodiment.
Figure 6B:
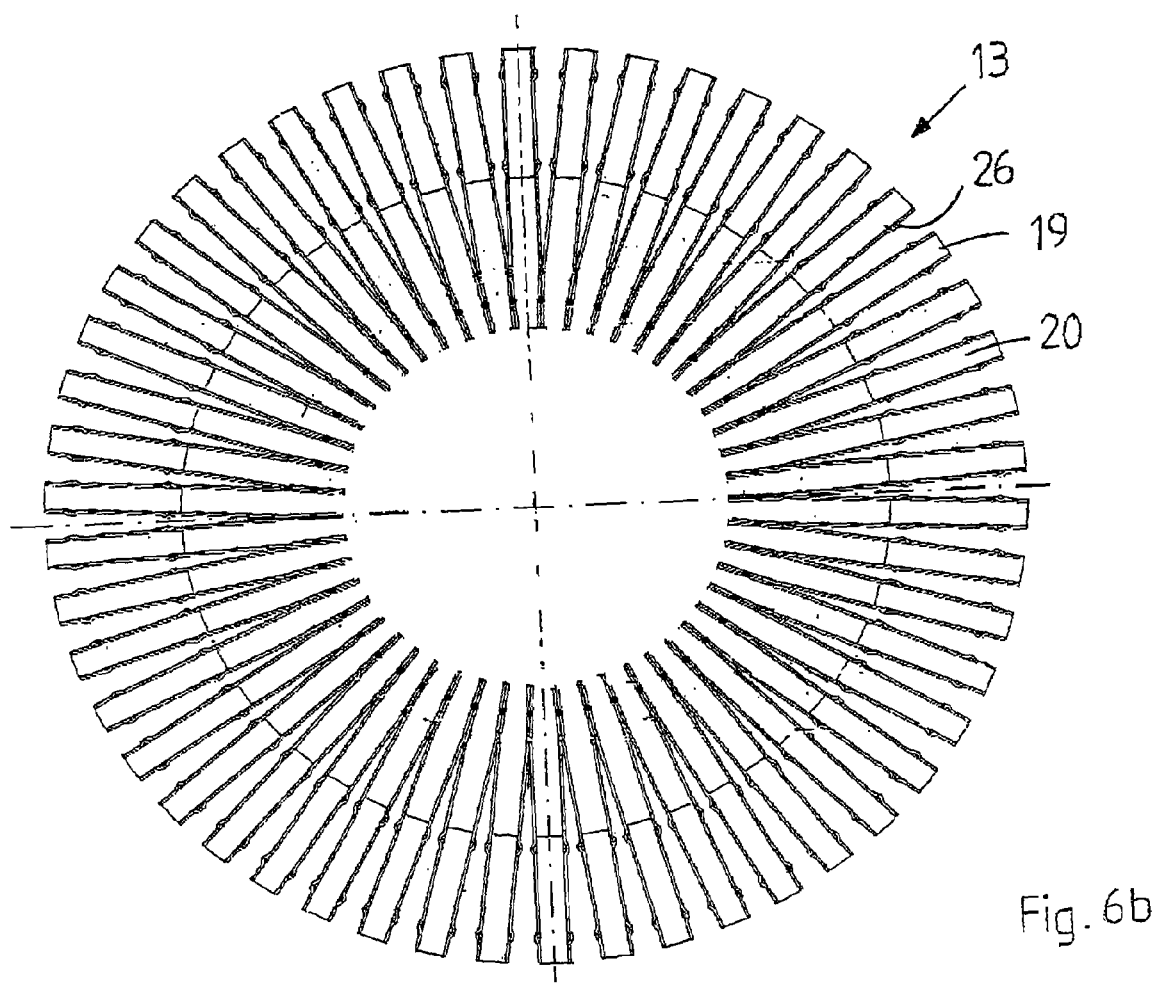

In the FIGS. 6a and 6b a very similar design of a ring of ribs 13 is shown using U-profiles 19. Here, too, the U-backs 25 of the U-profiles 19 again form the heat dissipation areas 20, with them pointing upward, though and being intended for the use of an upstream fan. Simultaneously, the U-profiles 19 are provided with beads 26 in order to, on the one hand, increase their stability in the axial direction (allowing a higher pressure on the PTC heating elements 10 and/or the corresponding circular metal sheet 11, 12), and on the other hand, the air flowing through the ring of ribs 13 is additionally eddied, resulting in a better heat transfer from the ribs 19 to the air flow.

Figure 7A:
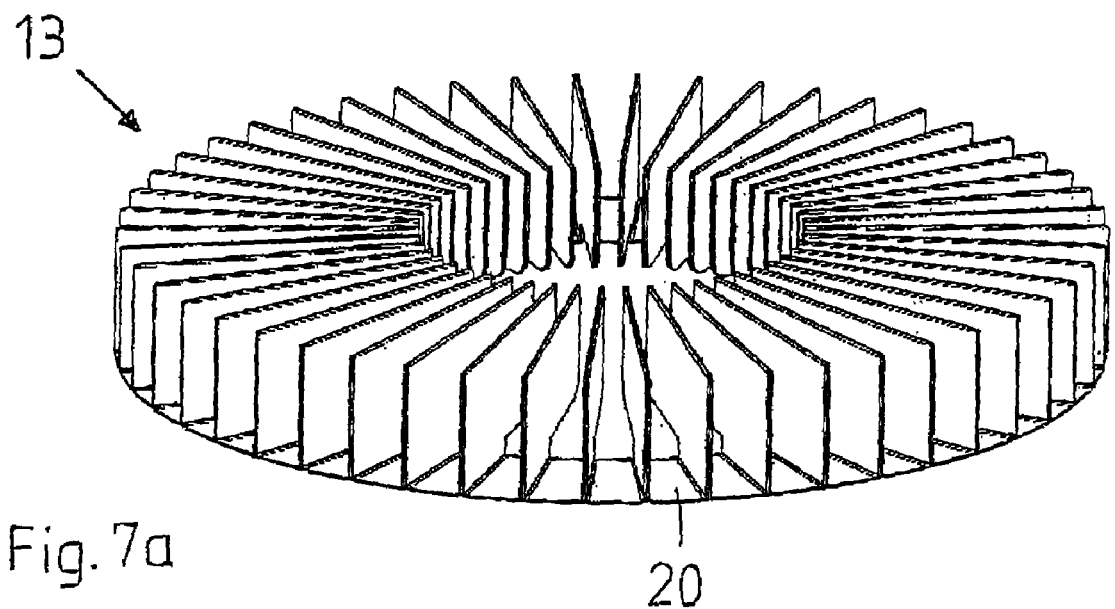
FIGS. 7a, 7b, 7c a perspective view from the top, from below, and a top view of a third embodiment of the ring of ribs.
Figure 7B:
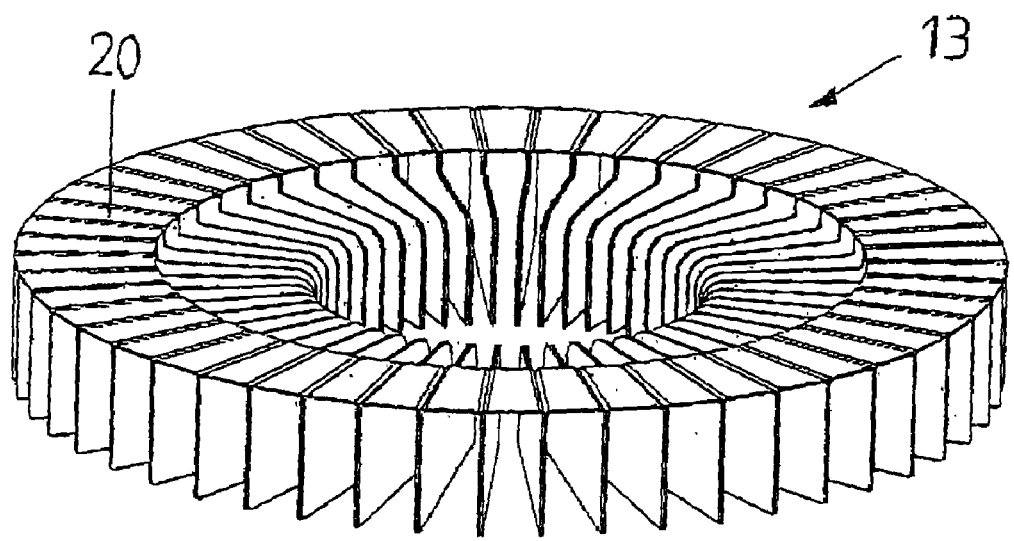
Figure 7C:
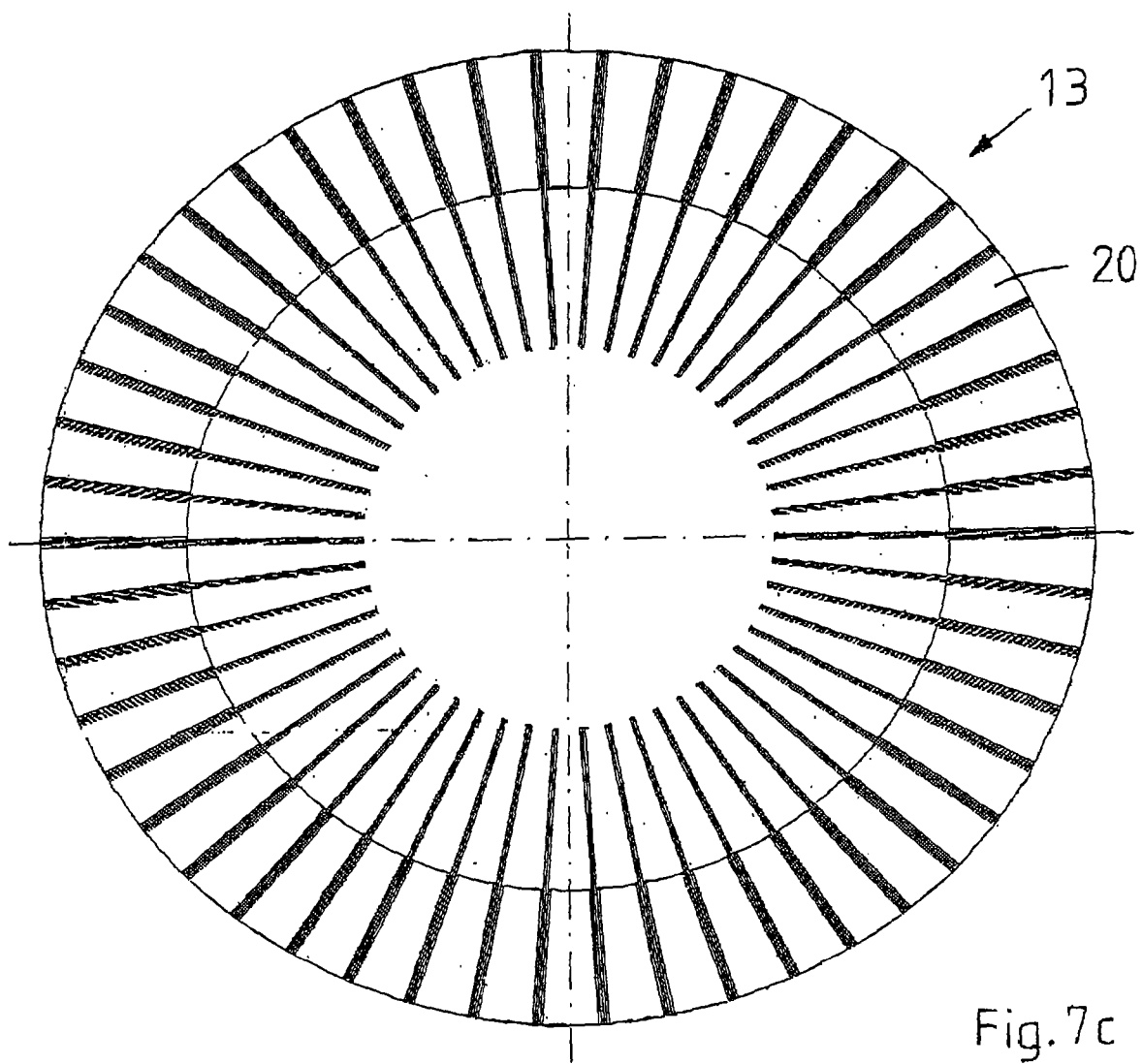

The ring of ribs 13 shown in FIGS. 7a, 7b, and 7c comprises a folded metal sheet rather than a multitude of individually produced ribs and/or profiles. Accordingly, the heat dissipation area 20, again positioned radially outward, is formed not by individual U-backs 25 but embodied continuously in the circumferential direction, which allows a higher heating output of the PTC heating elements 10 because the heat dissipation into the ring of ribs 13 is higher. From FIG. 7b it is also easily discernible that the ring of ribs 13 is embodied axially staggered in the radial direction.

Figure 8A:
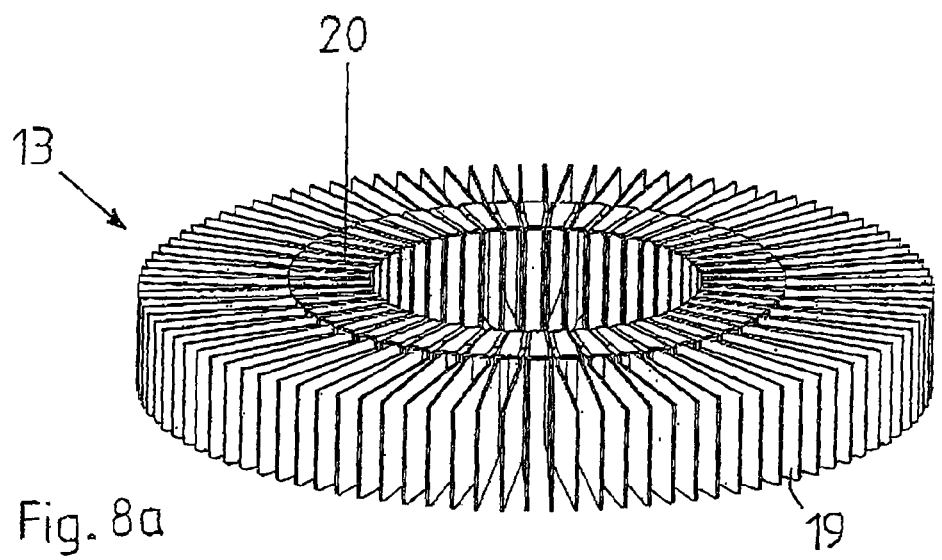
FIGS. 8a, 8b a perspective and a top view of a fourth embodiment of a ring of ribs.
Figure 8B:
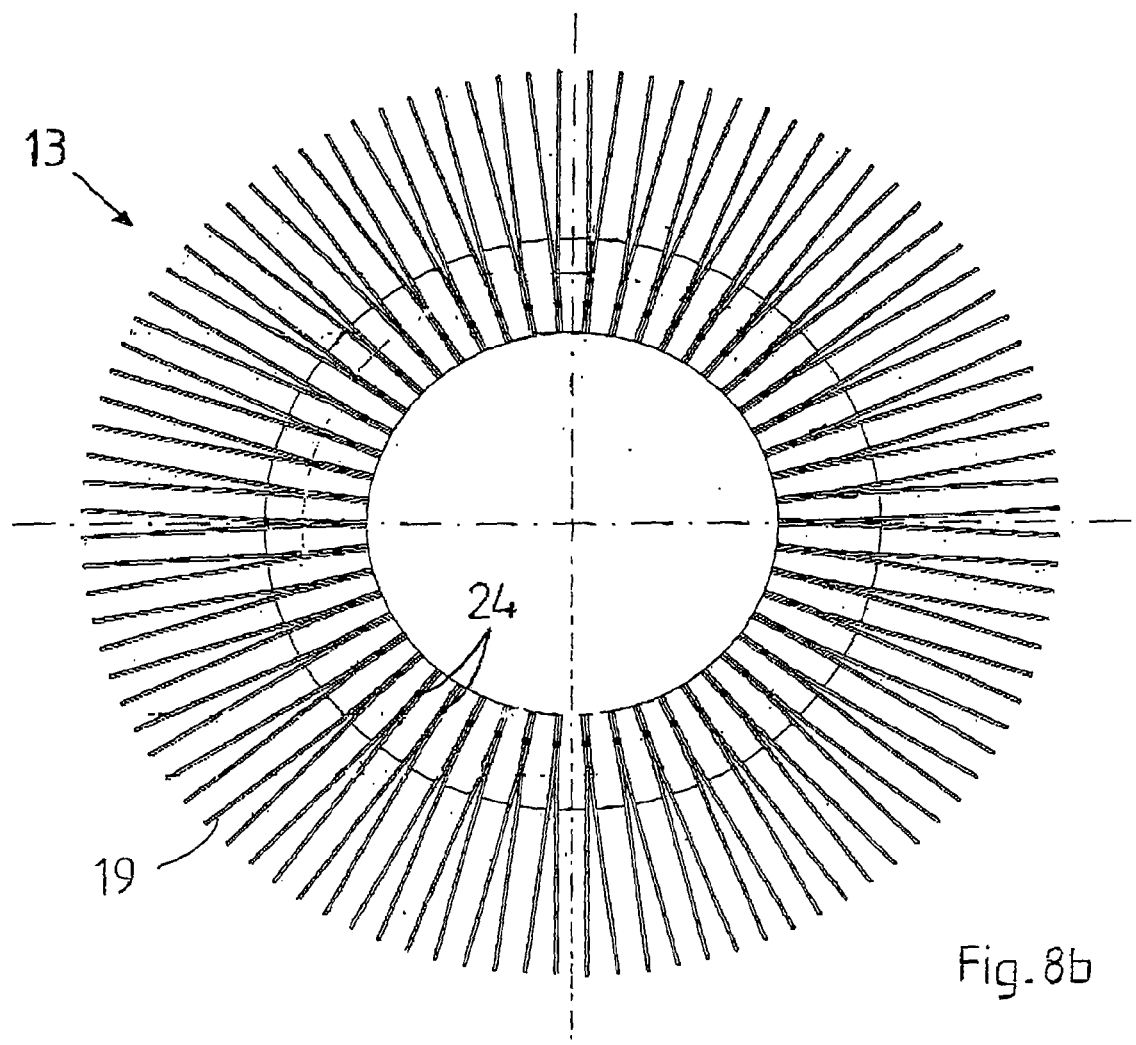

The ring of ribs 13 shown in the FIGS. 8a and 8b comprises individual U-profiles 19, which are mechanically and thermally connected to one another via welding spots 24. In contrast to the ring of ribs 13 shown in the FIGS. 5a and 5b here the U-backs 25 of the U-profiles 19 are arranged radially on the inside, and do not continue radially outward but form the heat dissipation areas 20 for a direct or indirect contacting of the PTC heating elements 10. This ring of ribs 13 is therefore suitable for the use in an electric heating module, in which the PTC heating elements 10 are arranged centrally on the inside.

Figure 9A:
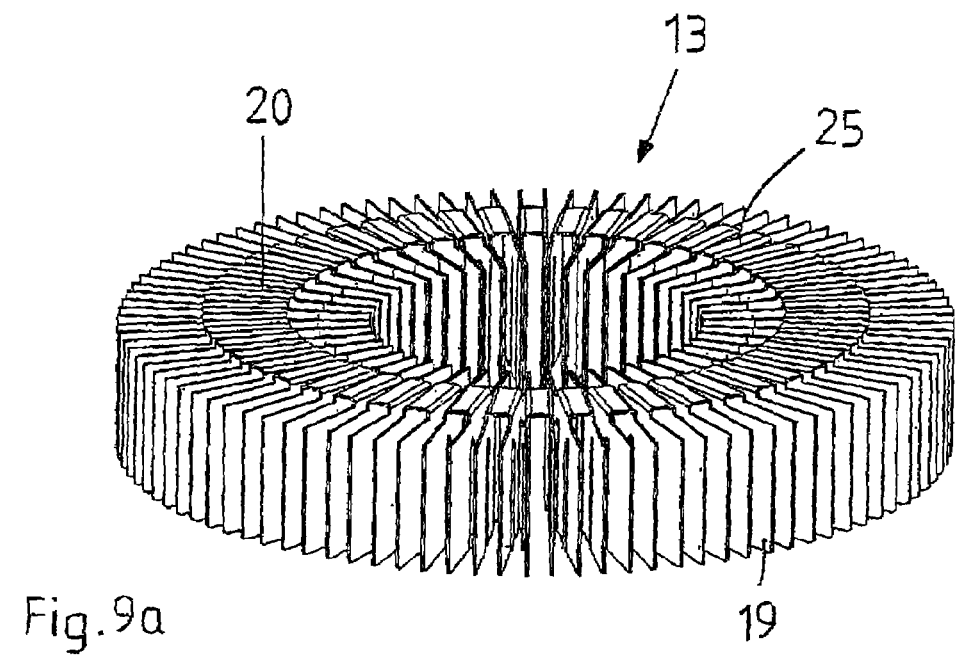
FIGS. 9a, 9b a perspective and a top view of a fifth embodiment of a ring of ribs.
Figure 9B:
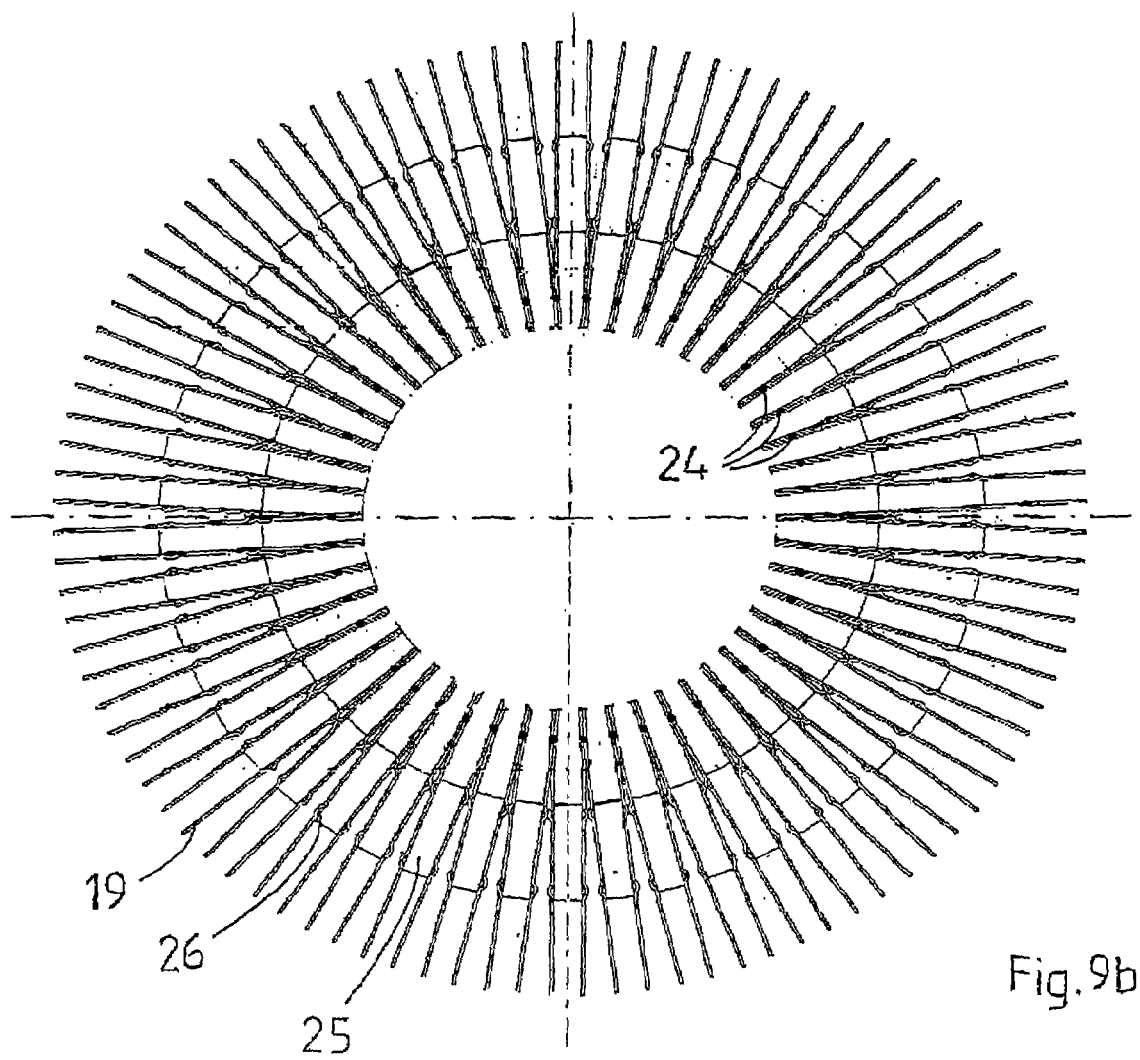

The ring of ribs 13 of FIG. 4 is shown in the FIGS. 9a and 9b. It comprises a multitude of U-profiles 19, which are mechanically and thermally connected to one another via welding spots 24, with the U-backs 25 not extending over the entire length of the U-profiles 19 but extending radially only to the extent necessary for forming the heat dissipation areas 20. The heat transfer sections 20 are arranged approximately centrally for each U-profile 19 so that the paths for conducting heat are kept advantageously short in each U-profile 19. In the area of the U-backs 25, four beads 26 are arranged at each U-profile 19 so that the U-profiles 19 and thus the ring of ribs 13 in their entirety are highly stable.

Figure 10A:
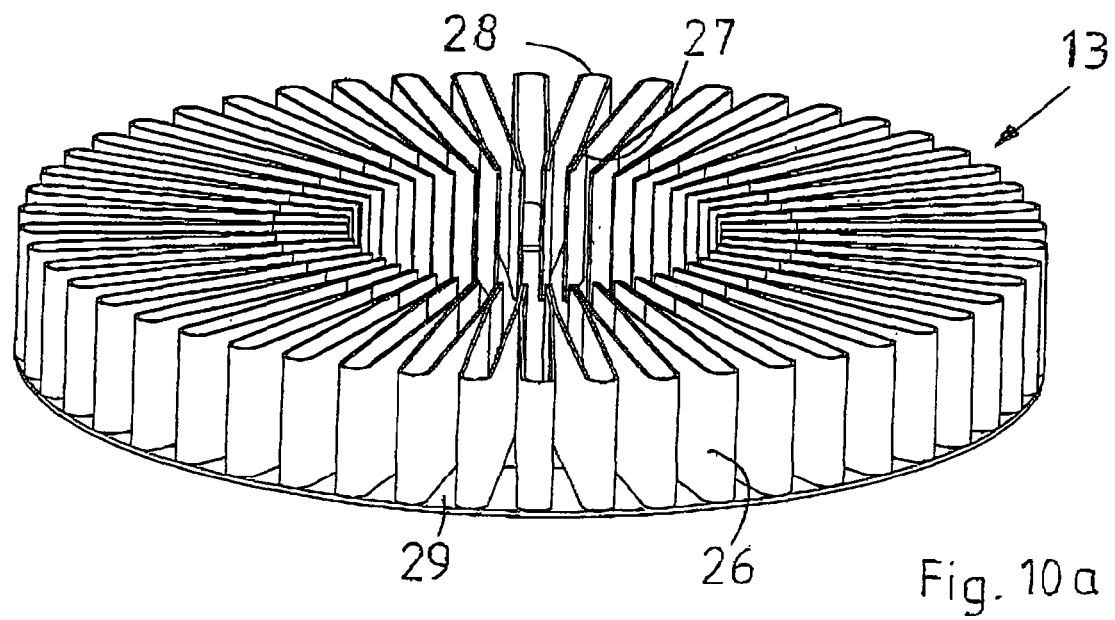
FIGS. 10a, 10b a perspective and a top view of a sixth embodiment of a ring of ribs.
Figure 10B:
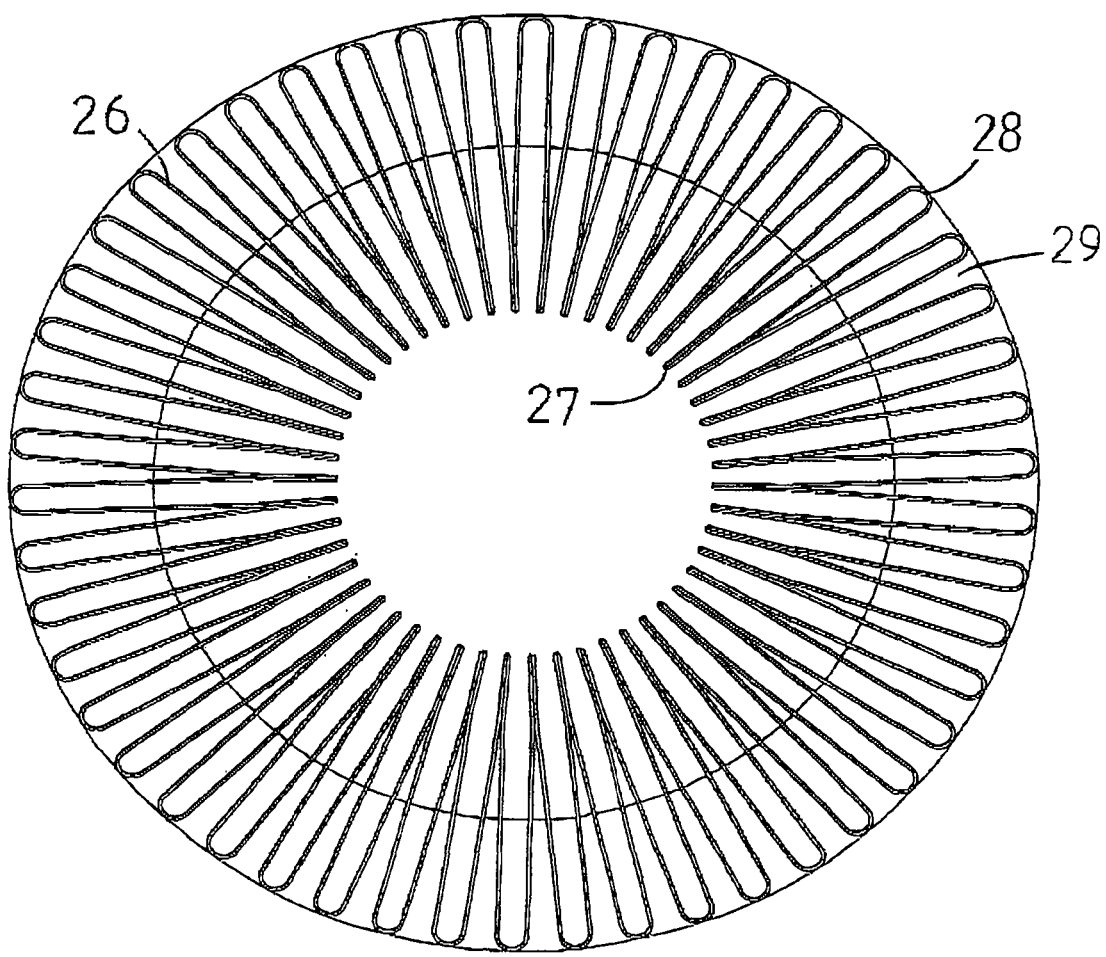

Finally, the FIGS. 10a and 10b show an alternative variant of the ring of ribs 13 of a heating module according to the invention. The heat conducting ribs are formed by a meandering bent metal sheet 26, with its bends 27 pointing towards the center of the heat dissipating area having smaller bending radii than the bends 28 pointing outward. This results in an overall circular embodiment of the ring of ribs 13. A heat transferring circular metal sheet 29 is positioned radially outwardly onto the ring of ribs 13 in order to optimize the heat transfer to the PTC heating elements and/or its circular metal sheets 11, 12.

The invention claimed is:

1. An electric heating module for heating air flow in vehicles, comprising at least one PTC heating element (10) and at least one heat dissipation area (13) adjacent thereto through which air can flow, having heat conducting ribs being in an effective contact to the PTC heating element (10) as well as a frame (1) combining the PTC heating element (10) and heat conduction ribs (13) to form a module, the heat dissipating area is formed generally circular, the at least one PTC heating element (10) is embodied flat with an upper and a lower contacting surface and is arranged such that the contacting surfaces are generally positioned in radial planes, while the heat conducting ribs (13) are provided with heat dissipating areas (20) by which they are supported indirectly via contact elements (11, 12) conducting electric current and/or directly on the upper and/or the lower contacting surfaces of the PTC heating element (10), the frame (1) can be separated at a generally radially extending parting plane (5), and a spring element (14) is inserted into the frame (1) at the parting plane (5) of the frame (1) for axially pressing the heat conducting ribs (13) against the PTC heating element (10) and/or the contact elements (11, 12).

2. An electric heating module according to claim 1, wherein the heat conducting ribs (13) are arranged extending generally radially.

3. An electric heating module according to claim 2, wherein the heat conducting ribs (13) are formed from one or more bent metal sheets (26) in a meandering fashion, with inwardly directed bends (27) that point to a center of the heat dissipating area each having a smaller bending radius than outwardly directed bends (28).

4. An electric heating module according to claim 3, wherein the inwardly directed bends (27) directed towards the center of the heat dissipating area each are compressed to a fold.

5. An electric heating module according to claim 1, wherein the spring element (14) comprises soft-elastic material.

6. An electric heating module according to claim 5, wherein the spring element (14) is formed from an O-ring.

7. An electric heating module according to claim 6, wherein the O-ring is provided with circumferential recesses (15).

8. An electric heating module according to claim 1, wherein a heat dissipating—circular metal sheet (29) is mounted as a heat dissipating area onto the heat conducting ribs (13).

9. An electric heating module according to claim 1, wherein a ventilator housing (2) is mounted at the frame (1) or formed thereon.

10. An electric heating module according to claim 9, wherein an axial fan (21) or a diagonal fan (8) is located in the ventilator housing (2).

11. An electric heating module according to claim 10, wherein the heat dissipating area, through which air can flow, is arranged upstream from the fan (8, 21) in a laminar inflow area thereof.

12. An electric heating module according to claim 10, wherein the heat dissipating area, through which the air can flow, is arranged downstream from the fan (8, 21) in an outflow area thereof.

13. An electric heating module according to claim 9, wherein the frame (1) and the ventilator housing (2) together form a generally cylindrical air flow channel.

14. An electric heating module according to claim 13, wherein the frame is provided with bars (7) extending into the air flow channel and to guide an air flow stream.

15. An electric heating module according to claim 14, wherein conically shaped, concentrically arranged guidance rings are mounted in the air flow channel at the bars (7) for radial deflection of out flowing air flow.

16. An electric heating module according to claim 13, wherein several PTC heating elements (10) are arranged circularly around the air flow channel.

17. An electric heating module according to claim 13, wherein the at least one PTC heating element (10) is arranged in a center of the air flow channel.

18. An electric heating module according to claim 1, wherein in the frame (1) below and above the PTC heating element (19), a lower circular metal sheet (11) and an upper circular metal sheet (12) are arranged for electrically contacting the PTC heating element, with the heat dissipating areas (20) being supported on one of the circular metal sheets (12) and a spring element (14) made from the soft-elastic material on the other one of the two circular metal sheets (11).

19. An electric heating module according to claim 18, wherein the circular metal sheets (11, 12) are provided with contact protrusions, which extend outward through openings in the frame (1).

20. An electrical heating module according to claim 18, wherein the heat conducting ribs are pre-finished as a connected ring of ribs (13).

21. An electric heating module for heating air flow in vehicles, comprising at least one PTC heating element (10) and at least one heat dissipation area (13) adjacent thereto through which air can flow, having heat conducting ribs being in an effective contact to the PTC heating element (10) as well as a frame (1) combining the PTC heating element (10) and heat conduction ribs (13) to form a module, the heat dissipating area is formed generally circular, the at least one PTC heating element (10) is embodied flat with an upper and a lower contacting surface and is arranged such that the contacting surfaces are generally positioned in radial planes, while the heat conducting ribs (13) are provided with heat dissipating areas (20) by which they are supported indirectly via contact elements (11, 12) conducting electric current and/or directly on the upper and/or the lower contacting surfaces of the PTC heating element (10), the frame (1) can be separated at a generally radially extending parting plane (5), and the frame (1) at least partially comprises soft-elastic material and has at the parting plane (5) a generally circular spring section for axially pressing the heat conducting ribs (13) against the PTC heating element (10) and/or the contact elements (11, 12).

22. An electric heating module for heating air flow in vehicles, comprising at least one PTC heating element (10) and at least one heat dissipation area (13) adjacent thereto through which air can flow, having heat conducting ribs being in an effective contact to the PTC heating element (10) as well as a frame (1) combining the PTC heating element (10) and heat conduction ribs (13) to form a module, the heat dissipating area is formed generally circular, the at least one PTC heating element (10) is embodied flat with an upper and a lower contacting surface and is arranged such that the contacting surfaces are generally positioned in radial planes, while the heat conducting ribs (13) are provided with heat dissipating areas (20) by which they are supported indirectly via contact elements (11, 12) conducting electric current and/or directly on the upper and/or the lower contacting surfaces of the PTC heating element (10), and the heat conducting ribs (13) generally comprise U-profiles (19), with U-backs (25) of the profiles forming the heat dissipating areas (20).

23. An electric heating module according to claim 22, wherein U-legs of the heat conducting ribs (13) are provided with bead-like surface structures (26) for guiding and/or eddying the air flow.

* * * * *